Nov. 10, 1959 S. L. FOSTER 2,912,659
CORE SEPARATOR FOR TRANSFORMERS
Filed May 27, 1957

Inventor
Samuel L. Foster
By Robert B. Benson
Attorney

United States Patent Office 2,912,659
Patented Nov. 10, 1959

2,912,659
CORE SEPARATOR FOR TRANSFORMERS

Samuel L. Foster, Eagle, Wis., assignor to Allis-Chalmers Manufacturing Company, Milwaukee, Wis.

Application May 27, 1957, Serial No. 661,852

3 Claims. (Cl. 336—60)

This invention relates generally to transformer cores. More specifically this invention relates to a separator partition for insertion between the stacks of laminations of a transformer core for cooling the core.

The cooling of the cores of transformers especially power transformers is a constant problem. One method of cooling the core is to divide the core into two separate stacks of laminations divided by a lattice type separator. A cooling fluid is circulated around the core and between the different stacks through the separator. The spacers must provide a support for the laminations and a conduit through which the cooling fluid can circulate longitudinally through the core.

A well known type of lattice separator is one having wavy longitudinal members fixed to straight support members. The support members of the separator form a means for separating the stacks of steel core laminations and the wavy members form a conduit through which the cooling oil is circulated to cool the transformer core. Directing the cooling fluid through the coil in a wavy path rather than a straight path facilitates the cooling of the transformer core.

The difficulties encountered in the use of this type of a separator is that the entire separator has to be inserted into the transformer tank or coil assembly before inserting the iron core laminations. The separator sometimes interferes with the assembly of the transformer core because transverse beams and support bars are often necessary to maintain the formation of the tank or coil assembly into which the laminations are inserted as the core is being assembled.

The core separator of this invention overcomes the problems encountered with the above mentioned core separator by calling for a lattice type separator which can be assembled in sections. This novel type of separator has sections comprising longitudinal members and transverse members which form a support for the iron laminations in the core and direct the cooling fluid between the different stacks of laminations in the transformer core. The sections of the separator are added as required during the assembly of the core.

Therefore it is the object of this invention to provide a new and improved core separator for transformers.

Another object of this invention is to provide a new and improved core separator for power transformers which may be assembled in sections in accordance with the progressive assembly of the core.

Other objects and advantages than those set forth above will be apparent from the following description when read in connection with the accompanying drawing, in which.

Figure 1:
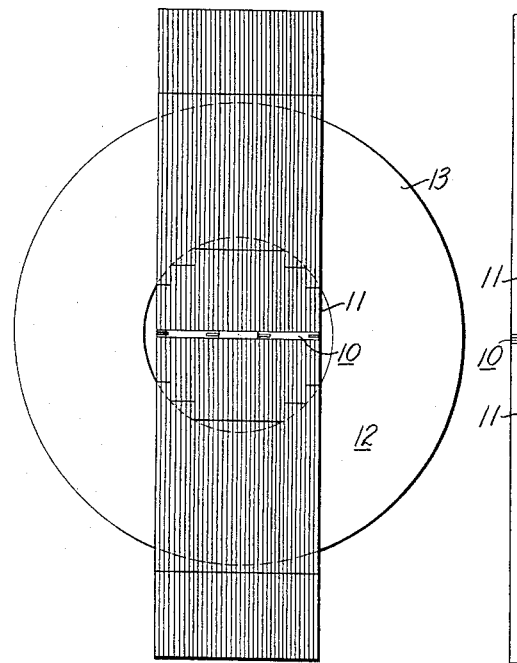
Fig. 1 is an end view of a transformer embodying the separator.
Figure 2:
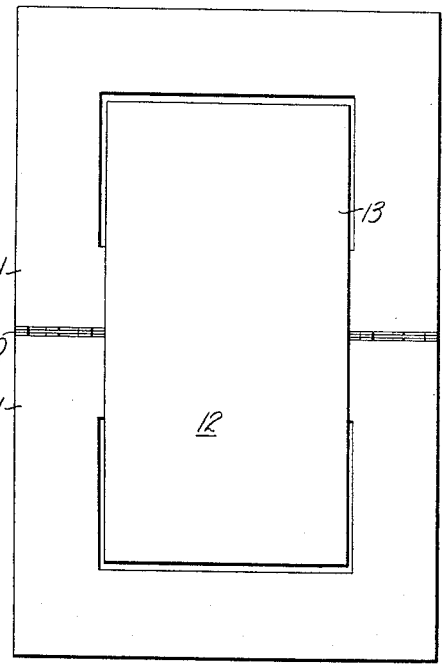
Fig. 2 is a side view of the transformer shown in Fig. 1.
Figures 3, 4:
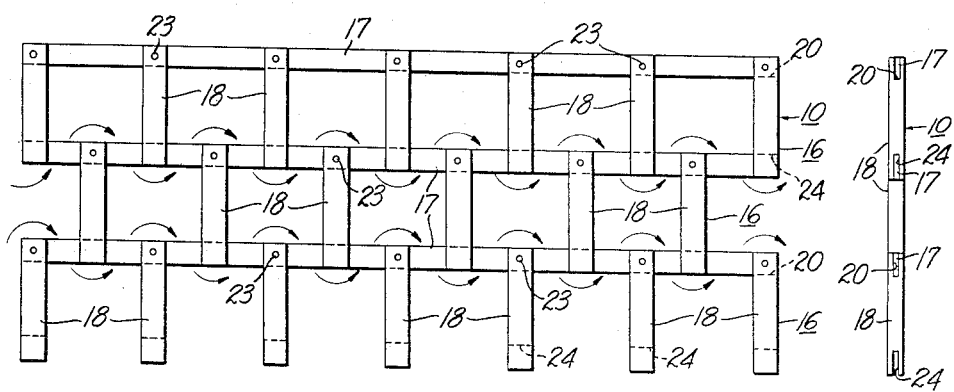
Fig. 3 is a side view of the core separator of this invention.
Fig. 4 is an end view of the core separator shown in Fig. 3.

The core separator 10 of this invention is illustrated in Fig. 1 inserted between the segregated stacks 11 of laminations extending through a coil 13 of a power transformer 12. As best seen in Fig. 3, the core separator 10 comprises a plurality of sections 16 made up of a longitudinal strip 17 having spacers 18 mounted on the strip at intervals. The strips 17 and spacers 18 are preferably made up of a vulcanized fiber insulating material although any suitable insulating material can be used.

The spacers 18 may be mounted on the strip 17 in any suitable way. Preferably as shown the spacers are wider than the strips and define a slot 20 at one end for receiving the strip of its section. The spacer may be slidably mounted on the strip 17 of its section to facilitate the positioning of the spacers on the strip. However, for ease in assembly the spacers 18 are mounted at predetermined intervals on the strip 17 of their section by means of rivets 23 or other suitable fasteners. The other ends of the spacers 18 define a slot 24 for mounting the section on the strip 17 of the adjacent section.

The longitudinal strips 17 are thinner than the spacers 18 to provide a conduit for the circulation of the cooling fluid. The spacers 18 being wider than the strips 17 support and separate the segregated stacks of laminations. The spacers 18 on adjacent strips 17 are staggered and act as baffles to direct the cooling fluid through the transformer in a wavy path to further facilitate the cooling of the transformer. The cooling fluid enters from one side and follows a wavy path around alternate spacers as shown by the arrows in Fig. 3 until it reaches the other side of the separator.

The feature of this core separator is that it comes in sections adapted to be mounted on top of the longitudinally extending strip of the section just beneath it. The advantage of constructing the separator in this way is that one section can be placed in a transformer tank or coil assembly and the laminations stacked up to near the top of that section of the separator before inserting the next section. This construction allows for the positioning of braces within the tank or coil assembly across the top of the partially assembled core to support the tank and maintain its form during assembly of the transformer core. When the laminations have been stacked up to a height approximately equal to one section of the core separator a second section is inserted and more core laminations positioned in the tank. This procedure is repeated until the last section of the separator is in position and the assembly of the core is completed.

Although but one embodiment has been illustrated and described, it will be apparent to those skilled in the art that various changes and modifications may be made therein without departing from the spirit of the invention or from the scope of the appended claims.

What is claimed is:

1. A sectional lattice type separator for transformer cores made up of segregated stacks of laminations, said separator comprising a plurality of sections, each of said sections having a longitudinally extending strip and a plurality of spacers, said spacers having one end mounted on said strip, the other end of said spacers being adapted for connection to the strip of an adjacent section, said spacers being wider than said strips to substantially span the space between said segregated stacks to form baffles therebetween, said spacers of adjacent sections alternating along an intervening one of said strips to define a wavelike conduit through said core for conducting therethrough cooling fluid disposed in said transformer.

2. A sectional lattice type separator for transformer cores made up of segregated stacks of laminations, said separator comprising a plurality of sections, each of said sections having a longitudinally extending strip and a plurality of spacers, said spacers having one end mounted on said strip and positioned to extend at substantially right angles to said strip; the other end of said spacers having a groove for receiving the strip of an adjacent section, said spacers being wider than said strips, and substantially spanning the space between said segregated stacks to form supports therebetween, said spacers of adjacent sections being staggered longitudinally to form baffles that cooperate to define a wavelike conduit through said core for conducting therethrough cooling fluid disposed in said transformer.

3. A sectional lattice type separator for transformer cores made up of segregated stacks of laminations, said separator comprising a plurality of sections, each of said sections having a longitudinally extending strip and a plurality of spacers, said spacers having one end slidably mounted on said strip, the other end of said spacers having a groove for receiving the strip of an adjacent section, said spacers being wider than said strips to substantially span the space between said segregated stacks to form supports therebetween, said spacers of adjacent sections being staggered longitudinally to form baffles that cooperate to define a wavelike conduit through said core for conducting therethrough cooling fluid disposed in said transformer.

References Cited in the file of this patent

FOREIGN PATENTS 322,698    France _____ July 2, 1902